United States Patent [19]

Fox

[11] Patent Number: 4,539,816
[45] Date of Patent: Sep. 10, 1985

[54] HEAT AND LIQUID RECOVERY USING OPEN CYCLE HEAT PUMP SYSTEM

[75] Inventor: Bryce J. Fox, Shoreview, Minn.

[73] Assignee: Minnesota Mining and Manufacturing Company, St. Paul, Minn.

[21] Appl. No.: 460,482

[22] Filed: Jan. 24, 1983

Related U.S. Application Data

[63] Continuation of Ser. No. 250,558, Apr. 3, 1981, abandoned.

[51] Int. Cl.³ .............................................. F25B 9/00
[52] U.S. Cl. .......................................... 62/87; 62/402
[58] Field of Search ...................................... 62/85–88, 62/401, 402

[56] References Cited

U.S. PATENT DOCUMENTS

| | | | |
|---|---|---|---|
| 2,077,315 | 4/1937 | Ewing et al. | 62/88 |
| 2,409,159 | 10/1946 | Singleton et al. | 257/9 |
| 3,091,097 | 5/1963 | Friant | 62/85 |
| 3,165,903 | 1/1965 | Roc et al. | 62/173 |
| 3,226,948 | 1/1966 | Alderson et al. | 62/402 |
| 3,623,332 | 11/1971 | Fernandes | 62/87 |
| 3,854,300 | 12/1974 | Gerhold | 62/402 |
| 4,075,765 | 2/1978 | Karrer et al. | 34/20 |

FOREIGN PATENT DOCUMENTS

| | | |
|---|---|---|
| 485130 | 10/1955 | Belgium . |
| 2333213 | 6/1977 | France . |
| 2384534 | 10/1978 | France . |
| 708646 | 5/1954 | United Kingdom . |

Primary Examiner—Ronald C. Capossela
Attorney, Agent, or Firm—Cruzan Alexander; Donald M. Sell; Warren R. Bovee

[57] ABSTRACT

The present invention relates to the recovery of heat and/or condensable liquid from a gaseous environment utilizing an open cycle heat pump system. The open cycle heat pump system is employed to alter the temperature of a gas by compression, expansion, heat exchange, and combinations thereof, to condense selected vapors carried in the gaseous environment for removal from the gas. The open cycle heat pump system can also be used to extract the heat from a gas for use as desired.

12 Claims, 3 Drawing Figures

HEAT AND LIQUID RECOVERY USING OPEN CYCLE HEAT PUMP SYSTEM

This is a continuation of application Ser. No. 250,558 filed Apr. 3, 1981, now abandoned.

In the manufacture of coated products, solvents are commonly used in the coating dispersions or solutions to permit transfer and application of the coating. After coating, the coated web or article is often passed through an oven where the solvent is evaporated and the coating dried and cured. Sufficient air is passed through the oven to prevent the accumulation of excessive solvent vapor. If the solvent is combustible, enough fresh air is circulated through the oven to keep the solvent vapor concentration well below the lower explosive limit (L.E.L.).

Oven gas temperatures are often in the range of 40° C.–200° C. Discharging the gas passing through the oven therefore represents a substantial energy loss in the hot exhaust gas as well as a loss of the evaporated solvent vapors. It is therefore desirable to be able to recover the solvent and/or heat contained in the gas discharged from the oven.

The most common solvent recovery means presently used is a carbon adsorption system. Solvent laden air is passed through an activated carbon bed where the solvent vapors are adsorbed on to the surface of the carbon. When the carbon bed becomes saturated, or nearly so, the carbon is desorbed by passing steam through the carbon bed. The solvent and steam are then condensed and the solvent and water separated by decanting or by distillation. In practice, two or more beds are used so that the operation may be continuous with one bed adsorbing solvent vapors while another is being desorbed.

When solvent vapor is adsorbed onto the carbon surface, considerable energy is liberated. Precautions must be taken to keep the air stream at a low enough temperature and high enough relative humidity to prevent fires from occurring. Contaminates in the air stream may plug the carbon pores, and the carbon also tends to powder with use. To maintain effectiveness, the activated carbon in the beds must be periodically replaced.

Closed cycle vapor compression refrigeration systems are commonly used in the petroleum industry for cooling solvent vapors at high concentrations to cause condensation, but such systems are not widely used for recovering solvents in industrial manufacturing operations. Factors limiting their application for such use are: (1) The inability to reject heat from the condenser at sufficiently high enough temperature for use of the rejected heat in the oven; (2) The complexity of the machines required to obtain the necessary low temperatures to condense volatile solvent vapors at low concentrations, e.g. at concentrations below the L.E.L.; (3) Ice formation on the evaporator; and (4) Relatively low reliability and high maintenance costs.

Presently employed methods of solvent recovery are wasteful of energy. With the carbon adsorption system, fresh air is continuously supplied to the oven which air must be heated from the ambient air temperature to the oven temperature. The adsorption method also requires about four to seven pounds of steam to desorb a pound of solvent. Approximately 1000 BTU's are required to generate one pound of steam.

With the closed cycle refrigeration system, the air passing over the condenser is cooled in the process of condensing the solvent vapors. Either this air or ambient air must be heated for return to the oven. The latent heat of the condensed solvent vapors and the sensible heat from cooling of the air are rejected through the refrigeration condenser.

The present invention overcomes many of the disadvantages associated with the previously employed solvent recovery techniques by providing a novel means for condensing and recovering vapors from a gas, while at the same time providing the capability of recovering heat and work from the vapor-containing gas, thereby providing an energy-efficient system. The present invention also provides means for recovery of heat from a gas, particularly a process gas heated above the ambient, where the recovery of the vapor may or may not be desired.

The advantages of the present invention are achieved through the use of an open cycle heat pump system whereby heat and/or a condensable vapor are separated from a gas and recovered for further use. As used herein, the term "open cycle heat pump system" or "open cycle system" refers to a system wherein a working fluid is taken into the system, acted upon so as to change the pressure and temperature of the fluid to cause condensation of the condensable vapor contained therein, or advantageous heat transfer, and expelled. This is in contrast to a conventional closed refrigeration system where the working fluid e.g., freon, is sealed in a closed loop within the system and is continuously recycled to cool an air space by heat transfer between the working fluid and the air space.

The term "condensable vapor" as used herein, refers to materials which are normally liquid at room temperature, that is those materials which can be vaporized at temperatures normally encountered in industrial drying conditions, e.g. 20° C. to 200° C. whether at standard or reduced pressure, but which can exist as a liquid at temperatures at or near room temperature and at pressures at or near atmospheric pressure. The term thus includes the commonly used industrial solvents which are used in coating resin formulations and the like and which can be flashed or vaporized in conventional industrial drying ovens.

The open cycle system used in the recovery technique and apparatus described herein comprises an apparatus which operates on a working fluid to produce changes in pressure on the working fluid and, together with auxiliary cooling, if desired, causes selected vapors contained in the working fluid to condense. The system can also include means for providing heat recovery where vapor may or may not be condensed and collected.

In one embodiment the open cycle system comprises, in sequence, means for compressing the working fluid, means for cooling the compressed fluid, means for expanding the compressed fluid to further cool the fluid and means for removing condensate from the system at points where condensation occurs. In a preferred embodiment, the above system also comprises means for causing the expanded fluid to cool the compressed fluid prior to expansion.

In an alternative embodiment the compression/expansion sequence of the open cycle system may be reversed. This system would comprise, in sequence, means for expanding the working fluid to cool the fluid and cause condensation of the condensable vapor contained therein, means for removing the condensate at points where condensation occurs, and means for compressing said fluid to provide a pressure differential for the expander. Since the function of the compressor is to provide a pressure differential for the expander, in theory it may either precede or follow the expander in sequence. Further, in this alternative embodiment, means for cooling of the fluid prior to expansion is not needed although such cooling may be effected, if desired. In a preferred embodiment, the system also comprises means for utilizing the expanded fluid to precool the fluid entering the expander.

One aspect of the present invention relates to the removal of industrial solvents from solvent-laden materials. A system to effect such removal might comprise, for example, a circulating-gas drying oven having an open cycle solvent recovery unit in combination therewith for removing vaporized solvent from the circulating gas.

Another aspect of the present invention relates to a method of recovering condensable vapor from a gas stream or gaseous atmosphere, wherein the vapor-containing gas is compressed, cooled by a heat exchange means and expanded to produce further cooling. The cooled, expanded gas is then directed through a heat exchange means to effect pre-cooling of the compressed gas prior to expansion. The condensed vapor is collected and removed at one or more points in the processing cycle.

Yet another aspect of the invention relates to the recovery of heat from a gas utilizing an open cycle heat pump system, wherein heat from the gas is transferred to gas entering or reentering the process. The recovery of condensed vapor may or may not be important in such a process.

Air cycle heat pumps, in a different arrangement than conceived in this invention, have been used for many years in environmental control, e.g. automobile air conditioning and the cooling of aircraft cabins, see for example U.S. Pat. Nos. 3,686,893, 3,877,245 and 3,886,765. However, in so far as is known, the invention described herein is the first use of an open cycle heat pump system for industrial solvent and/or heat recovery.

The various features of the present invention can be seen in the drawings wherein.

Figure 1:
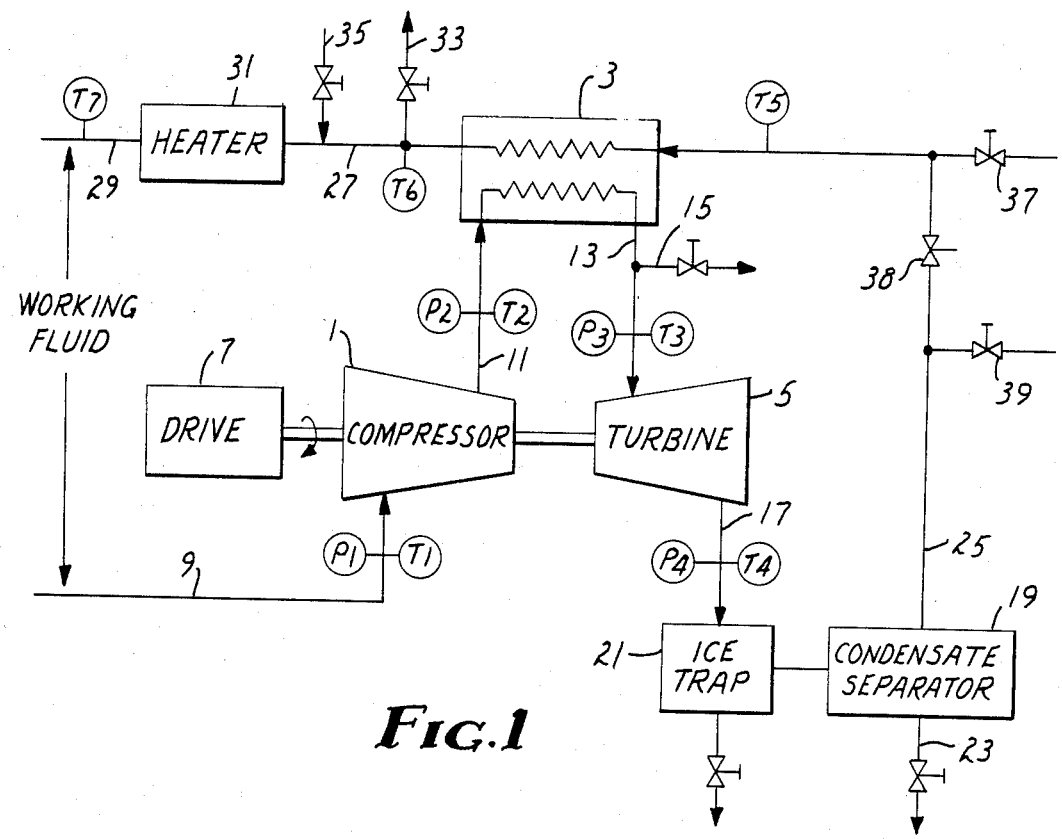
FIG. 1 is a schematic diagram of an open cycle heat pump system coupled to a working fluid.

An open cycle heat pump system useful in the present invention is shown in FIG. 1 and comprises, in combination, a compressor 1, heat exchanger 3, turbine or expander 5 and drive means 7 for the compressor 1, such as an electric motor. In the most advantageous arrangement, the compressor 1, and the turbine 5 are coupled together in such a manner that the work produced by the turbine 5 is utilized to help drive the compressor 1, thus reducing the load on the drive motor and improving the overall efficiency of the system.

In practice, a working fluid in the form of a condensable vapor-laden gas, such as air, at nominally atmospheric pressure, enters the recovery apparatus through inlet line 9 at temperature $T_1$ and pressure $P_1$ and is compressed by compressor 1 to $T_2$ and $P_2$ where the ratio of $P_2/P_1$ is generally about 1.3:1 to 3:1. Since the compression is essentially adiabatic, a working relationship which indicates the temperature rise can be expressed as $$\frac{T_2}{T_1} = \frac{P_2}{P_1}^{(\frac{n-1}{n})}$$

where the value of n is a ratio of the constant pressure and constant volume specific heats of the working fluid and is about 1.4 for air. These values are readily available for a number of gasses and can be found, for example, in the International Critical Tables, Volume 5, pages 80-82, and elsewhere.

Depending on the pressure ratio of the compressor and the initial temperature, the gas may leave the compressor at about 150° C. After leaving compressor 1, the gas passes through line 11, heat exchanger 3 and line 13, on its way to expander 5.

The precooled gas from heat exchanger 3 enters expander 5 where it expands back to nominal atmospheric pressure becoming cooled in the process according to the equation:

$$\frac{T_4}{T_3} = \frac{P_4}{P_3}^{(\frac{n-1}{n})}$$

The work produced during expansion is used to help drive compressor 1, thus reducing the load on drive motor 7.

Depending upon the vapor component, the concentration of vapors, the pressure and temperature, some vapors may condense in heat exchanger 3 enroute to expander 5. A drain line 15 is provided to remove and collect any liquid that may condense. Additional vapor may condense on cooling during passage through expander 5 and exit line 17. This condensate is captured and collected by means of a condensate separator 19. In addition, one or more ice traps, such as shown at 21, may be incorporated at one or more locations in the system in the event conditions exist which could cause ice formation in the working fluid which would accumulate in the separator 19, heat exchanger 3 or elsewhere in the system. On the other hand, if the system is operated at temperatures at which ice does not tend to form, the ice trap 21 can be omitted or bypassed.

The cooled gas can then be purged through line 23. However, in the most advantageous arrangement, the cooled gas with much of the vapor condensed and removed, exits the separator through line 25 and is returned to the working fluid stream or reservoir, generally at a point downstream from where withdrawn, via heat exchanger 3 and lines 27 and 29, where the gas is reheated to a temperature $T_6$ approaching or even exceeding the original working fluid temperature $T_1$. Heat exchanger 3 thus performs the dual function of precooling the gas enroute to expander 5 and reheating the cooled gas from expander 5, returning through line 25, before being returned to the working fluid stream or reservoir.

If desired, the gas exiting heat exchanger 3 may be heated to temperature $T_7$ by auxiliary heater 31 to maintain the desired working fluid temperature. Further, a portion of the gas exiting heat exchanger 3 may be purged through line 33 with corresponding make-up gas being provided through line 35 at a point in the system prior to or after auxiliary heater 31, as desired.

Valves 37, 38 and 39 may be used to bleed off or add make-up gas to the system, as may be desired. For example, if the condensable vapor contained in the gas is not valuable or otherwise need not be retained, the gas leaving condensate separator 19 may be vented through valve 39. By closing valve 38 and opening valve 37, ambient air or other gas may be passed through heat exchanger 3 to the process or working fluid reservoir via line 29. This arrangement allows recovery of heat from the gas entering line 9, even though the vapor, for example, water vapor, need not be recovered.

When the embodiment of the invention described above is used to recover heat, the compression and expansion means serves to temporarily alter the pressure and temperature of the gas passing therethrough so that the difference in temperature between the two quantities of gas entering the heat exchanger 3 is increased to promote heat transfer. In this way the temperature of the gas leaving the heat exchanger 3 through line 27 can be raised above the temperature of the gas entering the system through line 9. Thus, when the system is used to recover heat from a process gas heated above the ambient, gas can be returned to the process at the same or even higher temperature if desired.

The compressor and expander used in the present invention may be of any suitable type: reciprocating, vane, rotary screw, centrifugal, axial flow, or other type. High efficiency, e.g. about 70% or greater, is desirable in order to minimize the net drive power and to permit attainment of the low temperature for solvent vapor condensation.

The pressure ratio of the compressor and expander is a design variable that can be selected to optimize any given application. The greater the pressure ratio the greater the temperature change through the compressor and expander, but also the greater the net power required to drive the system. Generally, a pressure ratio of up to about 4:1, with pressure ratios in the range of 1.3:1 to 3:1 being generally preferred as the most advantageous. However, for some applications, for example, where very volatile vapors are to be condensed or other low temperature conditions must be obtained, a higher pressure ratio may be desirable. The compressor may be driven by an electric motor, gas turbine engine, steam turbine, or other suitable means.

The heat exchangers used in the open cycle system of the present invention can be any conventional type such as co-current, countercurrent, crossflow, gas-gas, gas-liquid, etc. It is desirable that the heat exchanger have an efficiency of about 70% or greater in order to enhance the economics of the process. Further, since the open cycle system described herein generally operates at relatively low pressure ratios, it is desirable that the pressure drop across the heat exchangers also be minimized to maintain efficiency. However, while the pressure drops must be minimized in a low pressure open cycle system, certain advantages also accrue in that the heat exchangers need not be hermetically sealed as with a closed cycle freon system and, due to the low pressure encountered, can be constructed of light duty economical materials.

Although a single heat exchanger is shown for purpose of illustration in FIG. 1, in practice, additional heat exchangers may be used before the compressor or between the compressor or expander for example, to reject heat from the gas entering the heat exchanger 3 through line 11. This is because a phase change (condensation) may occur in the heat exchanger 3 with respect to at least some of the condensable vapor contained in the gas in line 11, while no phase change will occur in the cooling gas in line 25 since all condensed vapor has been removed therefrom in separator 19. Accordingly, the capacity of the gas in line 25 to accept heat in heat exchanger 3 may be limited to the acceptance of sensible heat up to a limit of temperature $T_2$. Any excess heat given off by the condensation of vapor entering in line 11 can be advantageously rejected to another sink to improve efficiency of the system. Generally, this can be readily accomplished by the use of an auxiliary heat exchanger to extract heat from the gas entering in line 11 at some point intermediate heat exchanger 3. This configuration takes advantage of the maximum temperature differences at each end of the exchanger in a counter current mode in order to obtain maximum heat transfer.

In certain applications, it may be desirable to utilize additional air or water cooled heat exchangers in line 13 prior to expander 5 to provide additional precooling of the gas prior to expansion.

When operating conditions in the system are such that ice may form, e.g. when operating below 0° C. with a solvent, such as heptane, which does not depress the freezing point of water, some means or technique may be necessary for preventing the formation of or for the removal of frost and ice from the separator, heat exchangers or other parts of the system. This may be no more than a dual set of heat exchangers permitting defrosting of one set while the other is operating, or means, such as a molecular sieve, may be used to remove the moisture before it has a chance to collect on the component surfaces. Yet another technique is to inject a small quantity of alcohol, or other freezing point depressant, to depress the freezing point sufficiently to prevent frost or ice formation.

The separator, shown generally at 19 in FIG. 1, must perform the function of separating the condensed liquid droplets from the gas stream in which it is entrained. Useful separators are well known in the art and can take the form of screens or packed columns which provide a large surface area on which the droplets can coalesce and drain away.

Figure 2:
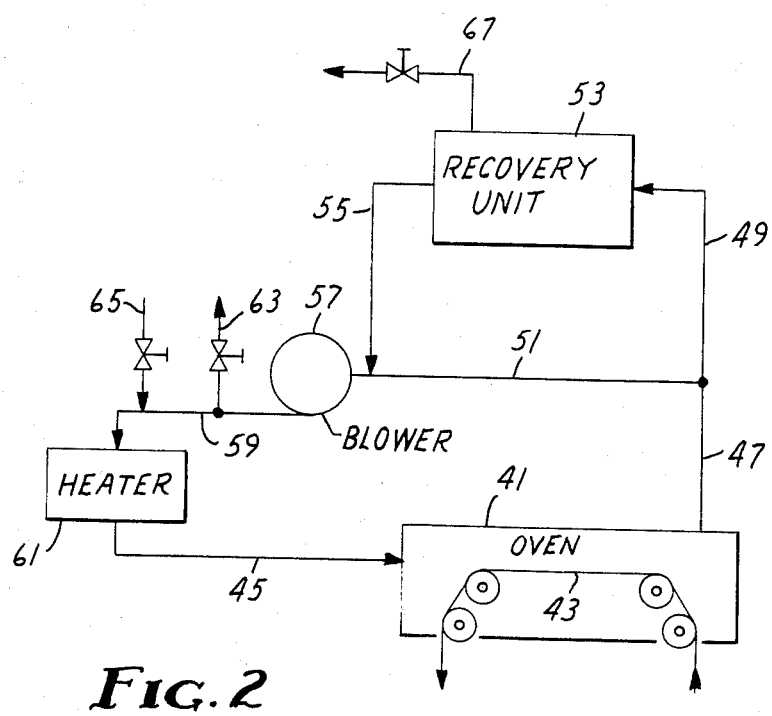
FIG. 2 is a schematic diagram of an apparatus according to the present invention comprising a circulating gas drying oven in combination with an open cycle heat pump system for solvent recovery.

Referring now to FIG. 2, there is shown a circulating gas oven 41 wherein a solvent-coated web 43 can be moved through the oven 41 counter to (shown) or in the same direction as the gas flowing through oven 41.

As can be readily appreciated, the gas may be a heated gas to aid in the solvent removal. Alternatively, the solvent-coated web may be heated by other means to drive off the solvent, such as by radiation heating or conductive heating techniques.

The gas drying medium is introduced into the system through line 45 and enters the oven 41 where it passes over and around web 43, picking up solvent from the coating on web 43. The gas drying medium then exits the oven 41 through line 47. At least a portion of the solvent vapor-containing exit gas is fed through line 49 to a solvent recovery unit 53 while the remainder of the gas is recirculated to the oven entrance through line 51, blower 57, line 59, heater 61 and line 45. A portion of the gas may be purged through line 63 with the desired amount of make-up gas provided through line 65. The solvent recovery unit shown generally at 53, such as a unit shown in FIG. 1, separates a portion of the condensable vapors from the gas and these are removed from the recovery unit 53 through line 67. In addition, recovery unit 53 may also extract heat from the gas medium entering recovery unit 53 and utilize the extracted heat to reheat the gas medium exiting the recovery unit through line 55, as has been discussed in greater detail with respect to FIG. 1.

The desired drying gas velocity and temperature through oven 41 is provided by blower 57 and heater 61. As discussed hereinbelow, the amount of drying gas flowing through recovery unit 53 is a function of the size and speed of the compressor in recovery unit 53.

When the recovery apparatus of this invention is to be used in combination with a circulating gas drying oven and where the gas exiting the recovery apparatus is to be returned to the oven, it is not necessary to remove all the solvent vapors in each pass through the recovery apparatus. The quantity of solvent vapor condensed for each unit of gas passing through the recovery apparatus and the volume rate of circulation are design trade-offs to be optimized for each particular installation. Further, the portion of gas to be circulated through recovery unit 53 will vary depending on various economic considerations. The size of the components of recovery unit 53 will depend on the flow rate of gas which must be processed. The cost of recovery unit 53 will depend to some extent on the size of the components. The flow rate of gas which must be processed is influenced by the oven temperature, oven web speed, solvent concentration, type, and costs. Thus, all of these are design factors which must be balanced in each case to obtain the most efficient process.

Due to the inherent characteristics of the open cycle heat pump system employed in the recovery unit 53 shown in FIG. 2, the unit is self-stabilizing to the extent that for a given working fluid flow rate, which will be a function of the size of the components, speed of compressor and turbine, etc., a change in concentration of condensable vapor entering the system causes a corresponding change in the amount of condensate removed from the working fluid. This is because the working fluid exiting the expander unit is always saturated with condensable vapor at the expanded temperature regardless of an increase in the concentration of condensable vapor in the working fluid entering the system.

Figure 3:
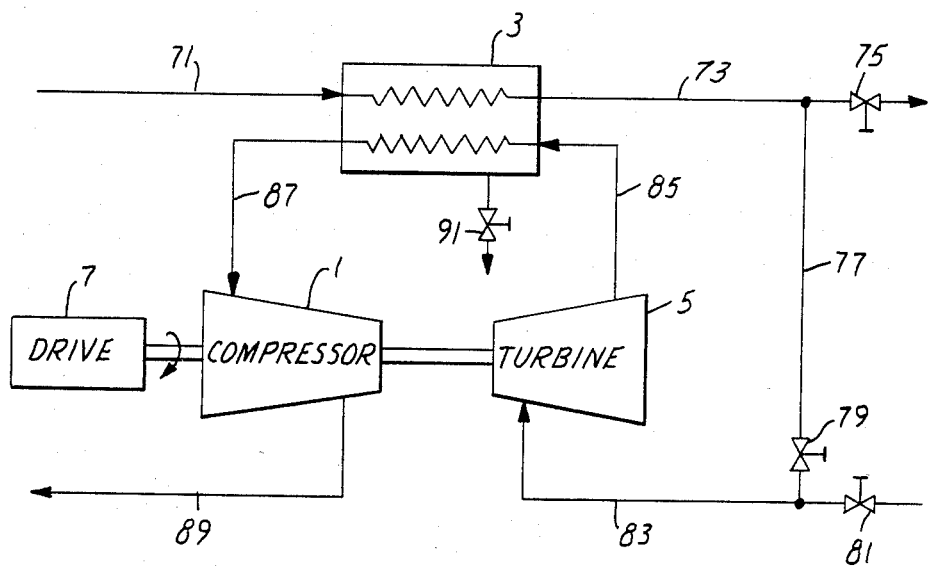
FIG. 3 is a schematic diagram of an alternative arrangement of an open cycle heat pump system particularly adapted for heat recovery from a working fluid.

As has been noted hereinbefore with respect to the system shown in FIG. 1, the open cycle heat pump system may be operated so as to recover heat from a gas even though the vapor need not be retained or recovered. For example, in a process where the primary liquid involved is water, it may not be necessary to recover the vapor although the recovery of heat in the gas may be desirable. In such a case, the gas from which the heat has been recovered may be either recycled or vented, as desired. Yet another means of accomplishing this result can be achieved by the arrangement of an open cycle system as shown in FIG. 3. Hot gas enters the system through line 71 and passes through heat exchanger 3 wherein heat is transferred to the gas entering the heat exchanger through line 85. Having cooled, and leaving the heat exchanger 3 through line 73 the gas, which may still contain vapor, may be vented through valve 75. After closing valve 79 in line 77, ambient air or other gas may then be allowed to enter through valve 81 and line 83 where it is cooled in expander 5. The cooled gas then flows through heat exchanger 3 where it is warmed by the gas entering through line 71. The warmed gas is then further heated on passing through compressor 1 before entering the process or reservoir of heated gas through line 89.

In the embodiment of the invention described above, the expansion and compression means serves to temporarily alter the pressure and temperature of the gas passing therethrough so that the difference in temperature between the two quantities of gas entering heat exchanger 3 is increased to promote heat transfer. Thus, when the system is used to recover heat from a process gas heated above the ambient, gas can be returned to the process at the same or even higher temperature if desired.

A drain line 91 is provided to remove condensate which may be formed in heat exchanger 3.

In instances where it is desired that the gas exiting the heat exchanger through line 73 should not be vented, e.g. where the gas contains valuable or toxic vapor or where the temperature of the ambient air or other gas source is much lower than the temperature of the gas in line 73, then by appropriate adjustment of valves 75, 79 and 81 the gas can be recirculated through line 83 etc. as described above to be reheated and reenter the process or gas reservoir.

As described with respect to FIG. 1 hereinabove, the work performed in the expander may be used to drive the compressor and improve the overall efficiency of the system.

The open cycle system can be designed to recover any common industrial solvent. Considerations for the recovery of heptane vapor (a common industrial solvent) are discussed hereinafter followed by a review of typical operating conditions encountered in an actual test unit.

The lower explosive limit (L.E.L.) for heptane vapor in air is 1.05 percent by volume. This corresponds to a vapor pressure of 7.98 millimeters of mercury in air at normal atmospheric pressure. To provide a margin of safety, it is common practice to limit the solvent vapor concentration to 50% of L.E.L. The saturation or dew point temperature for heptane at this concentration is approximately $-16°$ C. and the saturation temperature at 10% of L.E.L. is approximately $-36°$ C. With heptane as the solvent and operating at 50% of L.E.L., solvent vapor would begin to condense at a temperature of $-16°$ C. at atmospheric pressure. In passing through the compressor, the solvent vapor is compressed at the same pressure ratio as the air and since saturation temperature is a function of vapor pressure, heptane vapor will begin to condense in the heat exchanger at a temperature higher than $-16°$ C. If the air is cooled to $-16°$ C. in the heat exchanger, a substantial part of the heptane vapor would condense before the air stream entered the expander. Additional solvent vapor would be condensed as the air cooled during expansion to nominal atmospheric pressure in the expander. With the system designed so that the temperature of the expander exhaust were nominally $-36°$ C. and the condensed solvent coalesced and separated from the air stream, the air would return to the oven at nominally 10% of L.E.L. The air could then circulate through the oven until the solvent concentration reached approximately 50% of L.E.L. and then leave the oven to enter the compressor. The system would operate in equilibrium, condensing out solvent at the same rate it was evaporated from the source in the oven. Similar considerations would apply to the recovery of other condensable materials.

In a test arrangement, liquid heptane was atomized and sprayed into a compressed air stream where it evaporated. The air stream passed through a heat exchanger, an expansion turbine, and through a condensate separator comprising a liquid coalescer and separator and finally through the other side of of the aforementioned heat exchanger.

Following is a summary of conditions and results from a run on the test apparatus:

air flow—21.2 lb/min (9.6 kg/min)
air pressure—before heat exchanger—22.9 psia ($15.7 \times 10^4$ pascals)
air temperature—before heat exchanger—68.7° F. (20.5° C.)
liquid heptane injected—0.42 lb/min (0.19 kg/min)
heptane vapor concentration—0.57% by volume
heat exchanger outlet temperature——6° F. (−21° C.)
heptane liquid removed at heat exchanger—0.144 lbs/min (0.065 kg/min)
turbine outlet temperature——25° F. (−32° C.)
air pressure at turbine outlet—16.2 psia ($11.2 \times 10^4$ pascals)
heptane liquid removal from separator—0.096 lbs/min (0.04 kg/min).

Calculations of the saturation temperatures for a variety of solvents at various limiting concentrations in air, e.g. L.E.L., 50% L.E.L., 10% L.E.L. reveals the working fluid temperature which must be obtained for condensation to occur. For example, at 50% L.E.L. in air, a temperature of about −16° C. must be reached before heptane will be caused to condense. Operating at even lower temperatures will be cause a greater fraction of the heptane to condense. Similarly, for acetone at 50% L.E.L., a temperature of about −31° C. must be reached to cause condensation to occur, while for presmethyl isobutylketone (MIBK), condensation will begin to occur at about 20° C.

It can be seen that for some solvents, rather low temperatures must be otained to cause condensation when concentrations must be kept below the L.E.L. or 50% L.E.L. However, when "inert" gases are used as the working fluid, (e.g. a gas containing less than about 11% oxygen by volume, the remainder being, for example, nitrogen) solvents can be present in much higher concentrations and thus will condense at higher temperatures. Thus, while acetone at 50% L.E.L. (1.3% by volume) in the working fluid requires temperatures as low as −31° C. to condense, in an inert atmosphere, the concentration of acetone could be allowed to rise to, for example, 10% by volume and would then condense at temperatures of about 2° C. Heptane at 5% by volume (versus a 50% L.E.L. level of 0.5% by volume) will begin to condense at about 22° C.

What is claimed is:

1. Apparatus for removing condensable vapor from a gas entering at nominally atmospheric pressure consisting essentially of, in sequence, means for compressing said entering gas to pressures not exceeding about 60 psia, means for cooling said compressed gas, single expansion means for expanding said compressed gas back to its nominal entering pressure to further cool said gas to temperatures below 0° C. and means for separating condensate from said gas, said apparatus further including means for causing said expanded gas to cool said compressed gas prior to expansion, said compressing and expanding means having efficiencies at least about 70%, and pressure ratios of about 1.3:1 to about 4:1.

2. An apparatus according to claim 1 wherein the work produced by the expander is utilized to provide at least a portion of the driving force for the compressor.

3. An apparatus according to claim 1 wherein said cooling means is a heat exchanger means having condensate separating means associated therewith.

4. An apparatus according to claim 1 wherein at least one of said condensate separating means is located so that the gas stream exiting the expander passes therethrough.

5. An apparatus according to claim 4 wherein said condensate separating means includes a separating device selected from the group consisting of a demister, a coalescer or combinations thereof.

6. An apparatus according to claim 1 where said apparatus also includes an ice separating means for trapping ice which may form in the cooled gas stream.

7. Apparatus for removing condensable vapor from a gas entering at nominally atmospheric pressure comprising, in sequence, expander means for expanding said entering gas to cause cooling of said gas to temperatures below 0° C. and condensation of at least a portion of the condensable vapor therein, means for separating vapor condensed from said gas, and compressor means for compressing said gas back to its nominal entering pressure thereby providing a pressure differential for the expander, said compressing and expanding means having efficiencies of at least about 70% and having pressure ratios of about 1.3:1 to about 4:1.

8. An apparatus according to claim 7 comprising, in addition, a cooling means for cooling said gas prior to expansion.

9. An apparatus according to claim 8 wherein said cooling means comprises means for causing gas leaving the expander to cool said gas prior to expansion.

10. A method of separating condensable vapor from a gas existing at nominally atmospheric pressure, said method consisting essentially of steps wherein said gas is compressed to pressures not exceeding about 60 psia, cooled via a heat exchange means and expanded in substantially a single expansion step back to nominally atmospheric pressure to produce further cooling to temperature below 0° C., said expanded gas being redirected through said heat exchange means to effect cooling of said compressed gas, condensed vapor being collected and removed from the gas, said compression being in the ragne of about 1.3:1 to about 4:1 and being at least about 70% efficient.

11. A method according to claim 10 wherein said condensable vapor is a non-aqueous organic material.

12. A method according to claim 11 wherein said condensable vapor is an organic hydrocarbon which is liquid at standard temperature and pressure.

* * * * *